United States Patent [19]
Houghtby et al.

[11] Patent Number: 5,593,294
[45] Date of Patent: Jan. 14, 1997

[54] SCROLL MACHINE WITH REVERSE ROTATION PROTECTION

[75] Inventors: Timothy R. Houghtby; Roger W. Reineke; Kenneth J. Monnier, all of Sidney, Ohio

[73] Assignee: Copeland Corporation, Sidney, Ohio

[21] Appl. No.: 397,793

[22] Filed: Mar. 3, 1995

[51] Int. Cl.[6] .............................. F01C 17/00; F04C 18/04; F16D 63/00; F16D 67/02
[52] U.S. Cl. ........................ 418/55.1; 418/69; 418/181; 417/313; 188/82.6; 192/12 B; 192/149
[58] Field of Search ..................... 418/55.1, 69, 181; 417/223, 319, 313; 188/82.1, 82.6; 192/8 R, 12 B, 149

[56] References Cited

U.S. PATENT DOCUMENTS

| | | | |
|---|---|---|---|
| 1,956,188 | 4/1934 | Black | 188/291 |
| 2,922,378 | 1/1960 | Pabst | 418/69 |
| 3,509,743 | 5/1970 | Johnson | 192/41 R |
| 3,918,830 | 11/1975 | Schneider | 192/12 B |
| 4,574,423 | 3/1986 | Ito et al. | 188/82.1 |
| 4,696,630 | 9/1987 | Sakata et al. | 418/57 |
| 4,820,130 | 4/1989 | Eber et al. | 417/32 |
| 4,836,347 | 6/1989 | Johnston et al. | 192/45 |
| 4,998,864 | 3/1991 | Muir | 417/319 |
| 5,320,507 | 6/1994 | Monnier et al. | 418/69 |

FOREIGN PATENT DOCUMENTS

| | | |
|---|---|---|
| 61-40481A | 2/1986 | Japan . |
| 63-248990A | 10/1988 | Japan . |
| 48794 | 1/1992 | Japan . |

*Primary Examiner*—John J. Vrablik
*Attorney, Agent, or Firm*—Harness, Dickey & Pierce, P.L.C.

[57] ABSTRACT

A scroll compressor has a one-way drive for resisting and impeding objectionable reverse movement of the orbiting scroll member. The one-way drive includes a one-way clutch interconnecting a drive shaft with a stationary member of the compressor through a resilient member. Reverse rotation of the drive shaft causes a loading of the resilient member which then operates to cushion the stopping of the reverse rotation of the drive shaft. The one-way drive is inoperative during forward rotation of the drive shaft thus allowing normal operation of the compressor.

31 Claims, 6 Drawing Sheets

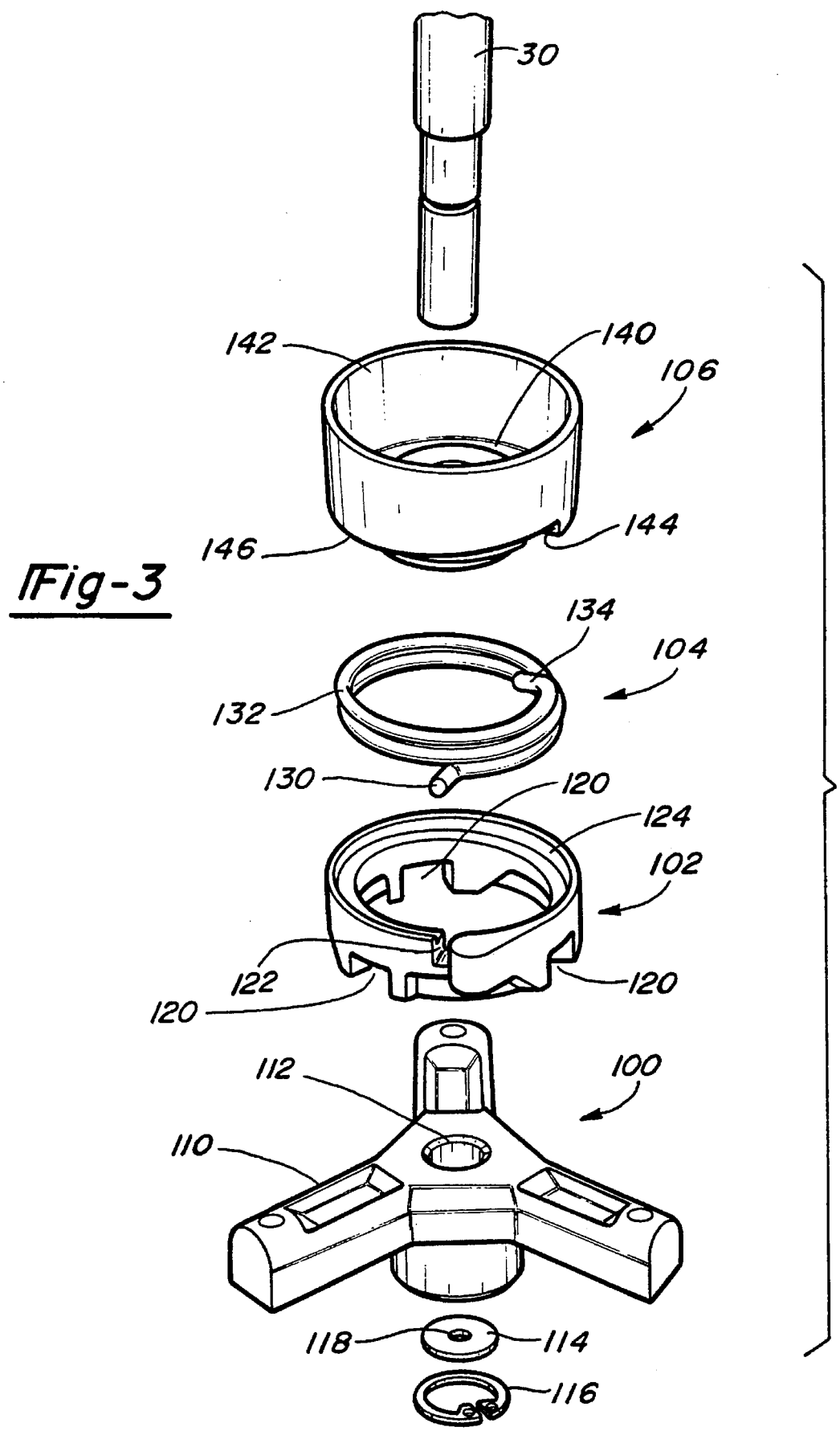

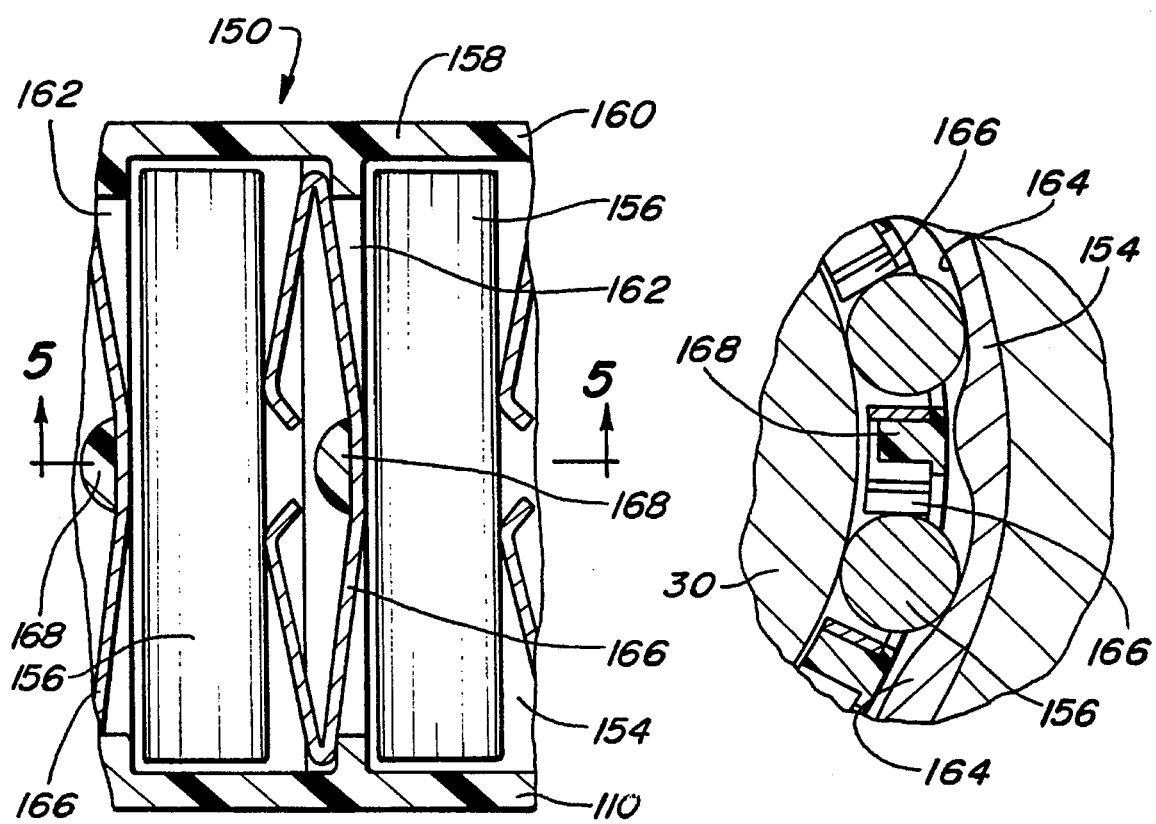

SCROLL MACHINE WITH REVERSE ROTATION PROTECTION

FIELD OF THE INVENTION

The present invention relates generally to scroll type compressors and more specifically to scroll type compressors incorporating a torsional brake operative to resist and impede reverse movement of the orbiting scroll member.

BACKGROUND OF THE INVENTION

Scroll type machines are becoming more and more popular for use as compressors in both refrigeration as well as air conditioning applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port toward a center discharge port. An electric motor is provided which operates to drive or orbit the orbiting scroll member via a suitable drive shaft which is affixed to the motor rotor. In a hermetic compressor, the lower portion of the hermetic shell normally contains an oil sump for lubricating and cooling the various components of the compressor.

Scroll compressors depend upon a seal created between opposed flank surfaces of the wraps to define successive chambers for compression which generally eliminates the requirement for suction and discharge valves. However, when these compressors are shut down, either intentionally as a result of the demand being satisfied or unintentionally as a result of a power interruption or other problems, there is a strong tendency for the gas in the pressurized chambers and/or backflow of compressed gas from the discharge chamber to effect a reverse orbital movement of the orbiting scroll member and its associated drive shaft. This reverse movement often generates objectionable noise or rumble. Further, in machines employing a single phase drive motor, it is possible for the compressor to begin running in the reverse direction should a momentary power failure be experienced. This reverse operation may result in overheating of the compressor and/or other damage to the apparatus. Additionally, in some situations, such as a blocked condenser fan, it is possible for the discharge pressure to increase sufficiently to stall the drive motor and effect a reverse rotation thereof. As the orbiting scroll rotates in the reverse direction, the discharge pressure will decrease to a point where the motor again is able to overcome this pressure head and rotate the scroll member in the "forward" direction. However, the discharge pressure will again increase to a point where the cycle is repeated. Such cycling may also result in damage to the compressor and/or its associated apparatus.

SUMMARY OF THE INVENTION

The present invention overcomes these problems by incorporating one-way drive means, such as a one-way clutch, coupled between the drive shaft and a lower bearing housing assembly disposed in the compressor oil sump. When the drive shaft of the present invention is rotating in the desired direction, the clutch is inoperative to lock the drive shaft to the housing assembly. When rotation of the drive shaft reverses, the drive shaft is locked to the housing assembly and through the utilization of a resilient spring, the reverse rotation the orbiting scroll member is resisted, thereby eliminating the objectionable noise generated upon shut down of the compressor. Further, this resilient spring operates to resist damage to the motor and/or the compressor resulting from a reversing of single phase motors as well as resisting the cyclical reversing resulting from a blocked or failed condenser fan. The one-way brake is passive in that it does not create any load during normal operation of the compressor.

The present invention is an improvement over the concept disclosed in assignee's U.S. Pat. No. 4,998,864, the disclosure of which is hereby incorporated herein by reference, wherein the drive shaft is connected to a rigid structure by a one-way clutch to prevent reverse rotation. Braking with the present invention is much gentler, thereby significantly increasing the life of the one-way clutch mechanism.

The present invention also incorporates an integral circular rotor shield of the type generally disclosed in assignee's U.S. Pat. No. 5,064,356, the disclosure of which is hereby incorporated herein by reference, and in assignee's aforementioned U.S. Pat. No. 4,998,864. Such a shield is useful in reducing the oil level in the area surrounding the rotating motor rotor during operation. In order to insure that sufficient lubricating oil is contained within the sump to assure adequate lubrication and/or cooling of the moving parts while also minimizing the overall height of the housing, it is sometimes necessary that the oil level in the lower portion of the shell extend above the rotating lower end of the rotor. However, the relatively high viscosity of the oil, as compared to refrigerant gas, creates an increased drag on rotation of the rotor resulting in increased power consumption. This problem is further aggravated in scroll compressors because they typically employ a counterweight secured to the lower end of the rotor. The integral shield of the present invention serves to reduce the amount of oil in the area of the rotating rotor and/or counterweight but still enables enough oil for the purposes of lubrication of the components.

Additional advantages and features of the present invention will become apparent from the subsequent description and the appended claims taken in conjunction with the accompanying drawings.

BRIEF DESCRIPTION OF THE DRAWINGS

In the drawings which illustrate the best mode presently contemplated for carrying out the present invention:

FIG. 3 is an exploded perspective view of the lower portion of the compressor shown in FIG. 1;

FIG. 4 is an enlarged view of the one-way clutch mechanism of the invention illustrated in FIG. 1, looking radially outwardly in a direction through the plane of the drawing, and showing the mechanism in driving mode;

FIG. 5 is an enlarged sectional view taken generally along line 5—5 in FIG. 4;

DESCRIPTION OF THE PREFERRED EMBODIMENT

Figure 1:
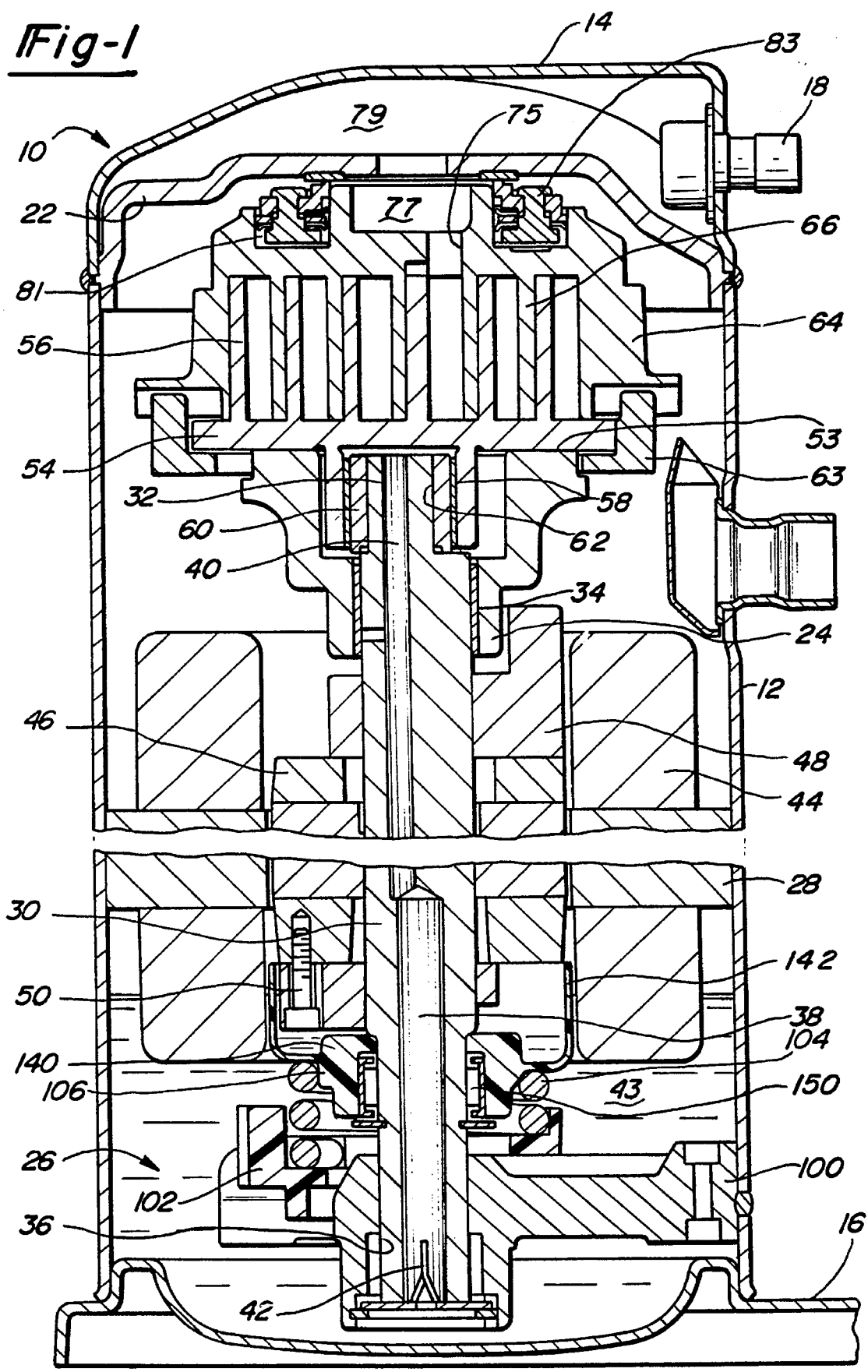
FIG. 1 is a vertical sectional view through the center of a scroll type refrigeration compressor incorporating a resilient spring in accordance with the present invention.

Referring now to the drawings in which like reference numerals designate like or corresponding parts throughout the several views, there is shown in FIG. 1 a compressor according to the present invention which is designated generally by reference numeral 10. Compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to the shell include a transversely extending partition 22 which is welded about its periphery at the same point that cap 14 is welded to shell 12, a main bearing housing 24 which is suitably secured to shell 12 and a lower bearing housing assembly 26 also suitably secured to shell 12. A motor stator 28 which is generally square in cross-section but with the corners rounded off is press fitted into shell 12. The flats between the rounded corners on the stator provide passageways between the stator and shell, which facilitate the return flow of lubricant from the top of the shell to the bottom.

A drive shaft or crankshaft 30 having an eccentric crank pin 32 at the upper end thereof is rotatably journaled in a bearing 34 in main bearing housing 24 and a bearing surface 36 in lower bearing housing assembly 26. Crankshaft 30 has at the lower end a relatively large diameter concentric bore 38 which communicates with a radially outwardly inclined smaller diameter bore 40 extending upwardly therefrom to the top of crankshaft 30. Disposed within bore 38 is a stirrer 42. The lower portion of the interior shell 12 defines an oil sump 43 which is filled with lubricating oil, and bore 38 acts as a pump to pump lubricating fluid up crankshaft 30 and into bore 40 and ultimately to all of the various portions of the compressor which require lubrication.

Crankshaft 30 is rotatively driven by an electric motor including stator 28, windings 44 passing therethrough and a rotor 46 press fitted on crankshaft 30 and having upper and lower counterweights 48 and 50, respectively.

The upper surface of main bearing housing 24 is provided with a flat thrust bearing surface 53 on which is disposed an orbiting scroll 54 having the usual spiral vane or wrap 56 on the upper surface thereof. Projecting downwardly from the lower surface of orbiting scroll 54 is a cylindrical hub having a journal bearing 58 therein and in which is rotatively disposed a drive bushing 60 having an inner bore 62 in which crank pin 32 is drivingly disposed. Crank pin 32 has a flat on one surface which drivingly engages a flat surface (not shown) formed in a portion of bore 62 to provide a radially compliant driving arrangement, such as shown in assignee's U.S. Pat. No. 4,877,382, the disclosure of which is hereby incorporated herein by reference. An Oldham coupling 63 is also provided positioned between and keyed to orbiting scroll 54 and a non-orbiting scroll 64 to prevent rotational movement of orbiting scroll member 54. Oldham coupling 63 is preferably of the type disclosed in assignee's U.S. Pat. No. 5,320,506, the disclosure of which is hereby incorporated herein by reference.

Non-orbiting scroll member 64 is also provided having a wrap 66 positioned in meshing engagement with wrap 56 of scroll 54. Non-orbiting scroll 64 has a centrally disposed discharge passage 75 which communicates with an upwardly open recess 77 which in turn is in fluid communication with a discharge muffler chamber 79 defined by cap 14 and partition 22. An annular recess 81 is also formed in nonorbiting scroll 64 within which is disposed a seal assembly 83. Recesses 77 and 81 and seal assembly 83 cooperate to define axial pressure biasing chambers which receive pressurized fluid being compressed by wraps 56 and 66 so as to exert an axial biasing force on non-orbiting scroll member 64 to thereby urge the tips of respective wraps 56, 66 into sealing engagement with the opposed end plate surfaces. Seal assembly 83 is preferably of the type described in greater detail in assignee's U.S. Pat. No. 5,156,539, the disclosure of which is hereby incorporated herein by reference. Scroll member 64 is designed to be mounted to bearing housing 24 in a suitable manner such as disclosed in assignee's aforementioned U.S. Pat. No. 4,877,382 or as disclosed in assignee's U.S. Pat. No. 5,102,316, the disclosure of which is hereby incorporated herein by reference.

Figure 2:
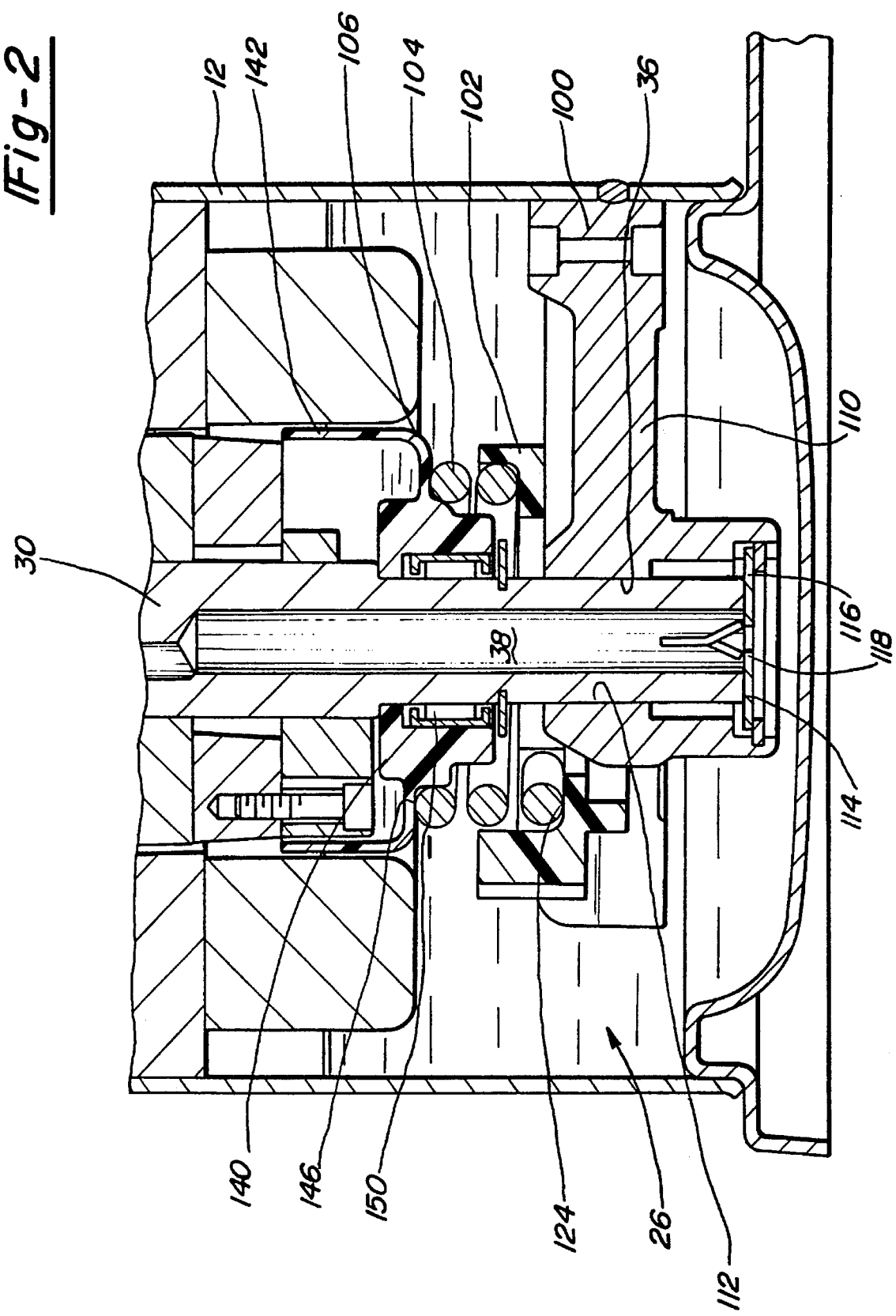
FIG. 2 is a fragmentary sectional view of the lower portion of the compressor shown in FIG. 1 illustrating the resilient spring of the present invention.

The resilient spring braking of the present invention is incorporated into lower bearing housing assembly 26. Lower bearing housing assembly 26, as best illustrated in FIGS. 1 through 3, comprises a lower bearing housing 100, a lower resilient spring reaction member 102, a spring 104 and an upper resilient spring reaction member 106.

Lower bearing housing 100 has a plurality of radially outwardly extending legs 110, each of which is also suitably secured to shell 12 by welding or other means known well in the art. Lower bearing housing 100 defines a through bore 112 within which is located bearing surface 36 which rotatably supports crankshaft 30. The lower portion of bore 112 is closed off by a washer 114 which is held in position by a retaining ring 116. An aperture 118 extends through washer 114 in order to allow lubricating oil to flow into bore 38.

Lower resilient spring reaction member 102 is an annular member which defines a plurality of slots 120 which extend partially into one side of member 102. The plurality of slots 120 correspond to the plurality of legs 110 of lower bearing housing 100 and each slot 120 engages a respective leg 110 to prohibit rotation of member 102 due to its engagement with lower bearing housing 100. The side of member 102 which is opposite to slots 120 is provided with a single slot 122 which engages one end of spring 104 to drivingly connect reaction member 102 to spring 104. Slot 122 opens onto a surface 124 provided on reaction member 102. Surface 124 is a ramped surface which is designed to mate with the spiral windings of spring 104 as shown in FIGS. 1 through 3.

Spring 104 is a round wire circular spring having a lower end 130, a plurality of coils 132 and an upper end 134. Lower end 130 is formed such that it extends radially outward from the plurality of coils 132 in order to engage slot 122 located within reaction member 102. When lower end 130 is located within slot 122, the lower coil of spring 104 rests on ramped surface 124 to position spring 104 and reaction member 102 in a generally co-axial relationship with crankshaft 30. This generally coo axial relationship with crankshaft 30 insures that the loading imposed on spring 104 will be only in a torsional direction. The diameter and quantity of the plurality of coils 132 along with the diameter and material of the wire used to manufacture spring 104 are chosen to provide the desired torsional rate for spring 104 and thus the braking characteristics for compressor 10 as will be described later herein. Upper end 134 of spring 104 is formed such that it extends radially inward from the plurality of coils 132 in order to engage upper resilient spring reaction member 106 as will be discussed later herein.

Upper resilient spring reaction member 106 is a generally cup shaped member which includes a generally disc shaped portion 140 and an integral annular wall 142. The cup shape of member 106 acts as an integral rotor shield to reduce the oil level in the area surrounding rotating motor rotor 46 and lower counter weight 50 during operation of compressor 10. The exterior or lower surface of portion 140 of member 106 defines a slot 144 which opens onto a surface 146 provided on reaction member 106. Surface 146 is a ramped surface which is designed to mate with the spiral windings of spring 104 as shown in FIGS. 1 through 3. Slot 144 is designed to engage upper end 134 of spring 104 to drivingly connect reaction member 106 to spring 104. When upper end 134 is located within slot 144, the upper coil of spring 104 rests on ramped surface 146 to position spring 104 and reaction member 106 in a generally co-axial relationship with crankshaft 30. This generally co-axial relationship with crankshaft 30 insures that the loading imposed on spring 104 will be only in a torsional direction. Reaction member 106 is rotatably secured to crankshaft 30 by a one-way clutch assembly 150.

As best seen with reference to FIGS. 2, 4, and 5, one-way clutch assembly 150 includes an outer housing 154, formed of steel or the like which is press fit into or otherwise secured to reaction member 106. Within housing 154, a plurality of circumferentially spaced roller pins 156 are rotatably supported within axially extending cavities defined by housing 154, which are channel-shaped in cross-section. A plastic retainer 158 comprising spaced annular end portions 160 and integral axially extending portions 162 is disposed within housing 154 between each roller 156. Each of the cavities is substantially identical, extending over the full length of each pin 156, and includes a rear wall 164 formed in housing 154 which tapers in a circumferential direction from one end wherein it is positioned at a maximum radial distance from the axis of rotation of shaft 30 to the opposite end wherein it is positioned at a minimum radial distance therefrom. At the maximum radial distance location, the distance between shaft 30 and wall 164 will be equal to or slightly greater than the diameter of each pin 156 and at the minimum radial distance location it is less than the diameter of each pin. A generally C-shaped leaf spring 166 is also disposed within each cavity and operates to urge each pin 156 toward the radially shallower end thereof. Each spring 166 is supported by a radial projection 168 on each portion 162 of retainer 158.

Thus, as best shown in FIG. 5, rotation of shaft 30 in a counterclockwise direction will act to move each pin 156 against its spring 166 and into an area of its cavity wherein pin 156 may rotate freely under action of shaft 30, with no drive forces being transmitted from the shaft to reaction member 106. However, should the direction of rotation of shaft 30 be reversed, the action of springs 166 and shaft 30 will cause each pin 156 to move into a shallower area of its cavity and thereby causing shaft 30 to operatively drive reaction member 106. In a presently preferred embodiment, it has been found that a Torrington Model RC-121610, or equivalent, one-way clutch assembly has provided satisfactory performance.

During the normal operation of compressor 10, crankshaft 30 is free to rotate in a counterclockwise direction in reference to FIG. 5. One-way clutch assembly 150 is inoperative thus allowing for the free rotation of crankshaft 30 with respect to lower bearing housing assembly 26 and the normal operation of compressor 10. When crankshaft 30 begins rotation in the opposite or reverse direction, one-way clutch assembly 150 locks crankshaft 30 to upper reaction member 106 of lower bearing housing assembly 26. Rotation of upper reaction member 106 by crankshaft 30 results in a load being imposed upon spring 104 in a direction which attempts to further wind the plurality of coils 132. The load applied to spring 104 is resisted by lower reaction housing 102 which is secured against rotation due to its engagement with legs 110 of lower bearing housing 100. The load applied to spring 104 by crankshaft 30 and the resultant winding of spring 104 provides a cushioned or relatively soft stopping of crankshaft 30 in the reverse direction, which in turn quickly impedes movement of orbiting scroll member 54 in the reverse direction. The braking characteristics of lower bearing assembly 26 will be determined by the design of spring 104.

Figure 6:
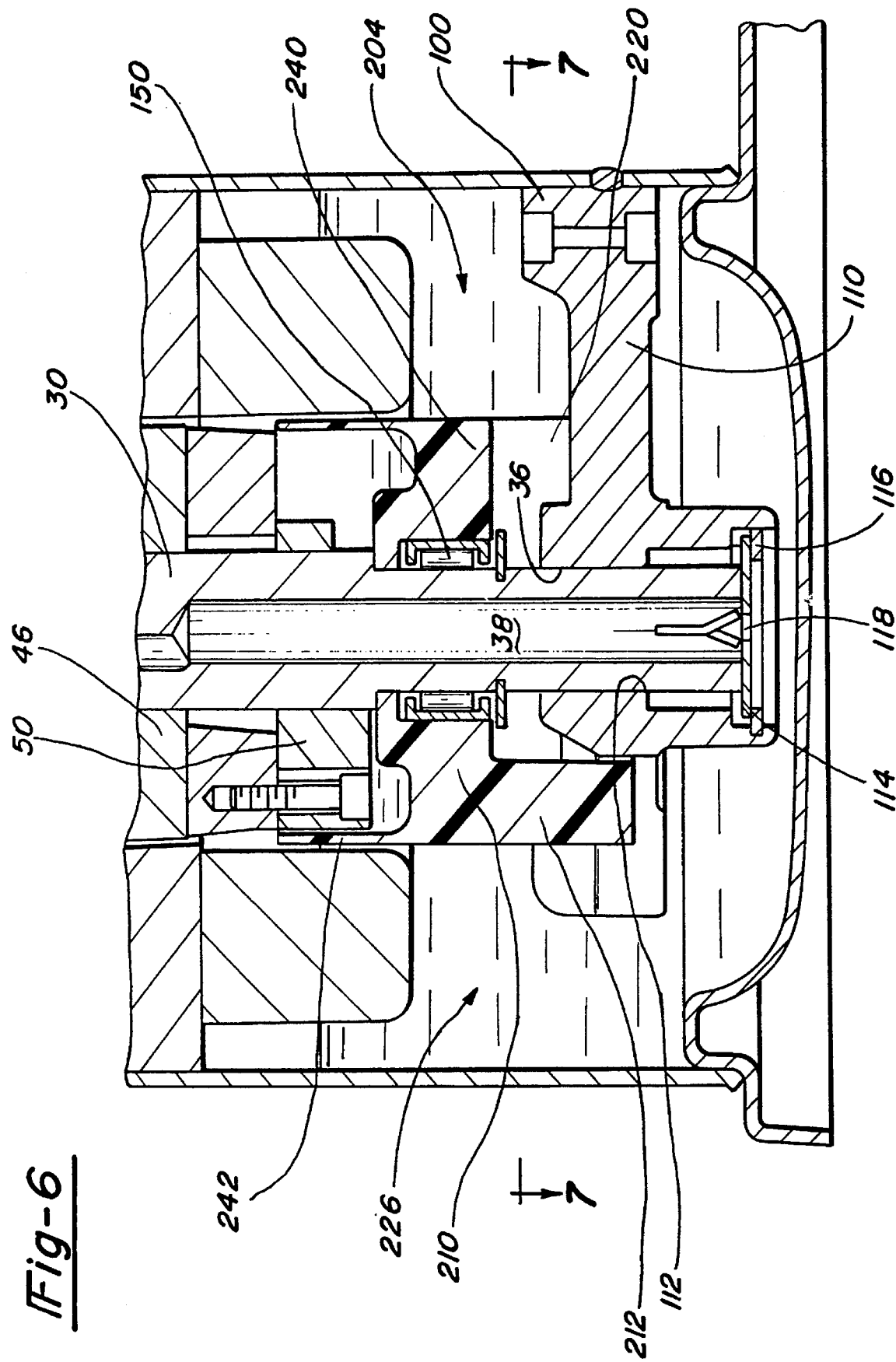
FIG. 6 is a fragmentary sectional view, similar to FIG. 2, of the lower portion of a compressor incorporating a resilient spring in accordance with another embodiment of the present invention.
Figure 7:
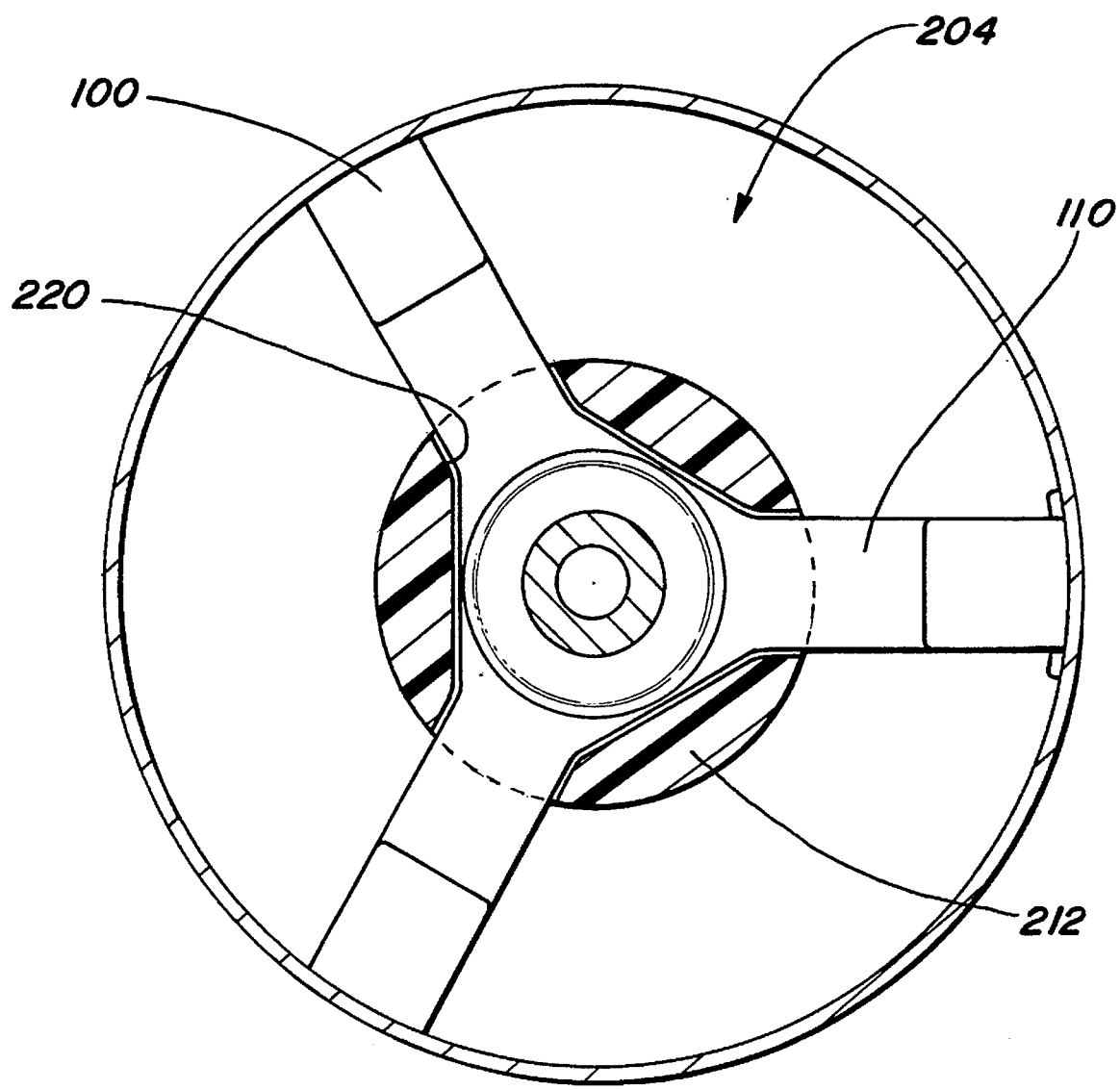
FIG. 7 is a plan view taken in the direction of arrows 7—7 shown in FIG. 6.

FIGS. 6 and 7 illustrate a lower bearing housing assembly 226 which incorporates resilient spring braking according to another embodiment of the present invention. Lower bearing housing assembly 226 comprises lower bearing housing 100 and a resilient spring 204. Resilient spring 204 can be manufactured from an elastomer, a polymer or any other material which provides the desired performance characteristics. One thermoplastic elastomer which has provided acceptable performance is DuPont Hytrel®.

As stated above, lower bearing housing 100 includes the plurality of radially outwardly extending legs 110, each of which is suitably secured to shell 12 by welding or other means known well in the art. Lower bearing housing 100 defines through bore 112 within which is located bearing surface 36 which rotatably supports crankshaft 30. The lower portion of bore 112 is closed off by washer 114 which is held in position by retaining ring 116. Aperture 118 extends through washer 114 in order to allow lubricating oil to flow into bore 38.

Resilient spring 204 includes an annular upper body 210 having a plurality of axially extending legs 212 which define a plurality of slots 220. The plurality of slots 220 correspond to the plurality of legs 110 of lower bearing housing 100 and each slot 220 engages a respective leg 110 to prohibit rotation of spring 204 due to its engagement with leg 110 of lower bearing housing 100. Annular upper body 210 of spring 204 includes a generally disc shaped portion 240 and an integral annular wall 242. Annular wall 242 acts as an integral rotor shield to reduce the oil level in the area surrounding rotating motor rotor 46 and lower counter-weight 50 during operation of compressor 10. Resilient torsional spring 204 is rotatably secured to crankshaft 30 by one-way clutch assembly 150.

As best seen with reference to FIGS. 4, 5 and 6, one-way clutch assembly 150 includes an outer housing 154, formed of steel or the like which is press fit into or otherwise secured to resilient spring 204. Within housing 154, a plurality of circumferentially spaced roller pins 156 are rotatably supported within axially extending cavities defined by housing 154, which are channel-shaped in cross-section. A plastic retainer 158 comprising spaced annular end portions 160 and integral axially extending portions 162 is disposed within housing 154 between each roller 156. Each of the cavities is substantially identical, extending over the full length of each pin 156, and includes a rear wall 164 formed in housing 154 which tapers in a circumferential direction from one end wherein it is positioned at a maximum radial distance from the axis of rotation of shaft 30 to the opposite end wherein it is positioned at a minimum radial distance therefrom. At the maximum radial distance location the distance between shaft 30 and wall 164 will be equal to or slightly greater than the diameter of each pin 156 and at the minimum radial distance location it is less than the diameter of each pin. A generally C-shaped leaf spring 166 is also disposed within each cavity which operates to urge each pin 156 toward the radially shallower end thereof. Each spring 166 is supported by a radial projection 168 on each portion 162 of retainer 158.

Thus, as best shown in FIG. 5, rotation of shaft 30 in a counterclockwise direction will act to move each pin 156 against its spring 166 and into an area of its cavity wherein pin 156 may rotate freely under action of shaft 30, with no drive forces being transmitted from the shaft to resilient spring 204. However, should the direction of rotation of shaft 30 be reversed, the action of springs 166 and shaft 30 will cause each pin 156 to move into a shallower area of its cavity and thereby causing shaft 30 to operatively drive resilient spring 204. In a presently preferred embodiment, it has been found that a Torrington Model RC-121610, or equivalent, one-way clutch assembly has provided satisfactory performance.

During the normal operation of compressor 10, crankshaft 30 is free to rotate in a counterclockwise direction in reference to FIG. 5. One-way clutch assembly 150 is inoperative thus allowing for the free rotation of crankshaft 30 with respect to lower bearing housing assembly 226 and the normal operation of compressor 10. When crankshaft 30 begins rotation in the opposite or reverse direction, one-way clutch assembly 150 locks crankshaft 30 to spring 204 of lower bearing housing assembly 226. Rotation of spring 204 by crankshaft 30 results in a load being imposed upon spring 204 which is resisted by the plurality of axially extending legs 212 which are secured against rotation due to their engagement with legs 110 of lower bearing housing 100. The resistance to rotation of spring 204 is caused by each leg 212 engaging a respective leg 110. The engagement between legs 110 and 212 results in a bending of legs 212 which places a portion of each leg 212 in compression and a portion of each leg in tension due to the bending. The forces of tension and compression react to resist the rotational movement of spring 204. The resultant winding of spring 204 provides a cushioned or relatively soft stopping of crankshaft 30 in the reverse direction, which in turn quickly impedes movement of orbiting scroll member 54 in reverse direction. The braking characteristics of lower bearing assembly 226 will be determined by the design and composition of spring 204.

While the above detailed description describes the preferred embodiment of the present invention, it should be understood that the present invention is susceptible to modification, variation and alteration without deviating from the scope and fair meaning of the subjoined claims.

What is claimed is:

1. A powered work producing apparatus comprising:

a powered mechanism for performing work;

a motor including a drive shaft and a stationary housing, said drive shaft being coupled to said mechanism for operatively driving same; and one-way drive means disposed between said drive shaft and said housing, said one-way drive means including a resilient member secured to said housing, such that undesirable rotation of said drive shaft in one direction is opposed by loading of said resilient member by said drive shaft, said one-way drive means permitting tree rotation of said drive shaft in the opposite direction.

2. A rotary compressor assembly comprising:

a rotary compressor;

a motor including a drive shaft and a stationary housing, said drive shaft being coupled to said compressor for operatively driving same; and one-way drive means disposed between said drive shaft and said housing, said one-way drive means including a resilient member secured to said housing such that undesirable rotation of said drive shaft in one direction is opposed by loading of said resilient member by said drive shaft, said one-way drive means permitting free rotation of said drive shaft in the opposite direction.

3. A scroll compressor assembly comprising:

a scroll compressor;

a motor including a drive shaft and a stationary_ housing, said drive shaft being coupled to said scroll compressor for operatively driving same; and one-way drive means disposed between said drive shaft and said housing, said one-way drive means including a resilient member secured to said housing such that undesirable rotation of said drive shaft in one direction is opposed by loading of said resilient member by said drive shaft, said one-way drive means permitting free rotation of said drive shalt in the opposite direction.

4. A scroll compressor according to claim 3 wherein said one-way drive means includes a one-way clutch.

5. A scroll compressor according to claim 3 wherein said resilient member is a coil spring.

6. A scroll compressor according to claim 3 wherein said resilient member includes an elastomeric material.

7. A scroll compressor according to claim 3 wherein said resilient member includes a polymeric member.

8. A scroll compressor according to claim 3 wherein said one-way drive means includes a first reaction member rotatably supported on said drive shaft.

9. A scroll compressor according to claim 8 wherein said one-way drive means includes a one-way clutch disposed between said drive shaft and said first reaction member.

10. A scroll compressor according to claim 8 wherein said one-way drive means includes a second reaction member secured to said housing.

11. A scroll compressor according to claim 10 wherein said one-way drive means includes a coil spring disposed between said first and second reaction members.

12. A scroll compressor according to claim 11 wherein said one-way drive means includes a one-way clutch disposed between said drive shaft and said first reaction member.

13. A scroll compressor according to claim 3 wherein said loading of said resilient member is caused by a torsional load applied to said resilient member.

14. A scroll compressor according to claim 3 wherein said loading of said resilient member is caused by a compressive load applied to said resilient member.

15. A scroll compressor according to claim 3 wherein said loading of said resilient member is caused by a tension load applied to said resilient member.

16. A scroll compressor according to claim 3 wherein said loading of said resilient member is caused by bending a portion of said resilient member.

17. A scroll compressor assembly comprising:

a stationary shell;

a scroll compressor disposed within said shell;

a motor disposed within said shell, said motor including a drive shaft coupled to said scroll compressor for operatively driving same; and one-way drive means disposed between said drive shaft and said shell, said one-way drive means including a resilient member secured to said shell such that undesirable rotation of said drive shaft in one direction is opposed by loading of said resilient member by said drive shaft, said one-way drive means permitting free rotation of said drive shaft in the opposite direction.

18. A scroll compressor according to claim 17 wherein said one-way drive means includes a one-way clutch.

19. A scroll compressor according to claim 17 wherein said resilient member is a coil spring.

20. A scroll compressor according to claim 17 wherein said resilient member includes an elastomeric material.

21. A scroll compressor according to claim 17 wherein said resilient member includes a polymeric member.

22. A scroll compressor according to claim 17 wherein said one-way drive means includes a first reaction member rotatably supported on said drive shaft.

23. A scroll compressor according to claim 22 wherein said one-way drive means includes a one-way clutch disposed between said drive shaft and said first reaction member.

24. A scroll compressor according to claim 22 wherein said one-way drive means includes a second reaction member secured to said housing.

25. A scroll compressor according to claim 24 wherein said second reaction member includes a bearing housing rotatably supporting said drive shaft.

26. A scroll compressor according to claim 24 wherein said one-way drive means includes a coil spring disposed between said first and second reaction members.

27. A scroll compressor according to claim 26 wherein said one-way drive means includes a one-way clutch disposed between said drive shaft and said first reaction member.

28. A scroll compressor according to claim 17 wherein said loading of said resilient member is caused by a torsional load applied to said resilient member.

29. A scroll compressor according to claim 17 wherein said loading of said resilient member is caused by a compressive load applied to said resilient member.

30. A scroll compressor according to claim 17 wherein said loading of said resilient member is caused by a tension load applied to said resilient member.

31. A scroll compressor according to claim 17 wherein said loading of said resilient member is caused by bending a portion of said resilient member.

\* \* \* \* \*

UNITED STATES PATENT AND TRADEMARK OFFICE
CERTIFICATE OF CORRECTION

PATENT NO. : 5,593,294
DATED : January 14, 1997
INVENTOR(S) : Timothy R. Houghtby; Roger W. Reineke; Kenneth J. Monnier It is certified that error appears in the above-indentified patent and that said Letters Patent is hereby corrected as shown below:

Column 1, line 66, after "rotation" insert -- of --.

Column 4, line 52, "coo axial" should be -- co-axial --.

Column 7, line 56, "tree" should be -- free --.

Column 8, line 6, delete "_".

Column 8, line 15, "shalt" should be -- shaft --.

Signed and Sealed this

Seventeenth Day of June, 1997

Attest:

BRUCE LEHMAN

Attesting Officer

Commissioner of Patents and Trademarks